Nov. 27, 1934.  F. E. BERTRAND  1,981,943
SOLE AND METHOD OF AND MEANS FOR OPERATING THEREON
Filed July 12, 1932
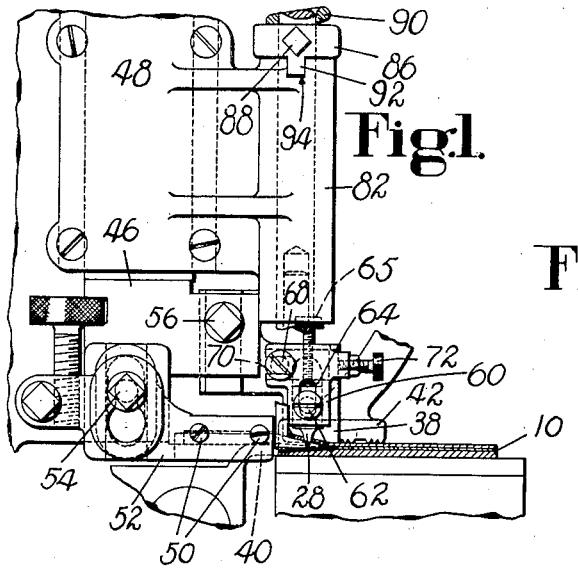
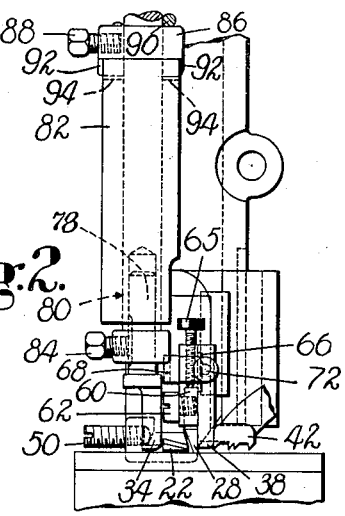
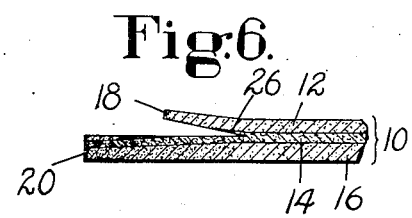
INVENTOR
Frederic E. Bertrand
By his Attorney
Victor Cobb Patented Nov. 27, 1934

1,981,943

UNITED STATES PATENT OFFICE 1,981,943

SOLE AND METHOD OF AND MEANS FOR OPERATING THEREON

Frederic E. Bertrand, Lynn, Mass., assignor to United Shoe Machinery Corporation, Paterson, N. J., a corporation of New Jersey Application July 12, 1932, Serial No. 622,030

22 Claims. (Cl. 12—27)

This invention relates to improvements in methods of and means for use in operating upon soles to prepare them for the attachment of lasted uppers thereto, and to improvements in soles as articles of manufacture. Although not necessarily limited thereto the invention is herein illustrated with reference to the performance of lip and feather-forming operations upon the margins of laminated insoles having inner layers which are more resistant to tearing than the outer layers of the insole.

The outer layers, at least, of laminated insoles of the type referred to are usually made of material adapted to serve as a substitute for leather, (an example of such material being a composition of wood fiber and rubber latex), and the inner layers of such insoles may be composed of material which is inherently tougher than that of the outer layers or which, for example, is made tougher by being subjected to greater compression or by having an excessive amount of latex or other toughening ingredient or strengthening substance incorporated therein. In such insoles it has been found that lasting lips formed in the usual way in the outer layers have been liable to tear away from the adjacent body portions of the insoles to such an extent as to render the lips unsuitable for properly holding in place the overlasted margins of shoe uppers. In other instances where laminated soles of the general type above mentioned have had slits or cuts formed therein for other purposes, such for example as for the purpose of rendering the soles more flexible, it has been found that the slits or cuts were liable to become extended beyond their original depth, as a result of the tearing of the adjacent sole material, to such an extent as unduly to weaken the soles.

One object of the present invention is to overcome the above-mentioned difficulties and to this end the invention provides an improvement in methods of operating on laminated soles having inner portions which are more resistant to tearing than outer portions of the soles which consists in cutting inwardly from an outer less resistant portion of a sole and terminating the cut within an inner more resistant portion of the sole, thereby insuring against liability of the slit becoming subsequently and undesirably extended beyond its original depth. As herein exemplified in its application to the forming of a marginal lip and a feather in a three-ply insole, the present method involves slitting the insole obliquely inward from the sole edge to form a sloping cut or slit extending downwardly through the upper layer and terminating at its inner extremity well within the material constituting the middle layer of the insole. A lip formed by slitting a sole margin in this manner is reinforced at its root or base portion by the tougher, more resistant material which constitutes the middle layer of the sole. Consequently the lip is less liable to tear away from the body of the sole than if the slit forming the lip terminated within the outer and less resistant layer or at the joint between the outer and inner layers of the sole. The feather produced beneath a lip formed in the manner just described presents an inwardly beveled upper surface and, in order to facilitate the lasting of the upper over a feather of that type in such a manner that the overlasted upper margins will present upper surfaces substantially flush with the body portion of the insole inside the lip, provision has been made, in accordance with another feature of the invention, for condensing the feather by means of pressure so as to make it of uniform thickness throughout its width and thus to present an upper surface substantially parallel to the upper surface of the body portion of the insole.

Considered in another aspect invention is to be recognized as residing also in a step product resulting from the practice of the improved method and consisting of a laminated sole having an interior portion more resistant to tearing than an exterior portion of the sole, and having a marginal slit extending through the exterior less resistant portion and terminating within the interior more resistant portion of the sole. As herein illustrated, the lip is of tapering cross-sectional form while the feather is of substantially uniform thickness throughout its width, the thickness of the feather being approximately the same as the thickness of the insole at the base of the lip.

The invention further consists in a sole-fitting machine which is adapted for use in carrying out the above-described method of sole fitting and which, as herein illustrated, is provided with an edge knife for forming an oblique edge slit in the sole edge and a beveled feather, a knife for slitting the face of the sole and cooperating with the edge knife in forming a lip which is narrower than the feather, and means for condensing the feather to uniform thickness. In order to facilitate the cutting of stock containing latex or a similar material the knife for slitting the sole face is herein shown as being mounted upon the presser gage associated with the edge knife and in a location in advance of the cutting edge of the edge knife.

The invention will be explained with reference to the accompanying drawing, in which Fig. 1 is a front elevational view of a portion of a sole-fitting machine equipped with means for carrying out the method of the present invention, certain portions of the machine being broken away to reveal parts otherwise hidden from view;

Fig. 2 is a side elevational view of the parts shown in Fig. 1;

Fig. 3 is a view, in horizontal section, and on an enlarged scale, of the operative parts shown in Figs. 1 and 2, illustrating the mode of operation of those parts upon an insole;

Fig. 4 is a sectional view, on an enlarged scale, taken substantially along the line IV—IV of Fig. 3;

Fig. 5 is a sectional view taken substantially along the line V—V of Fig. 3; and Fig. 6 is a sectional view of a marginal portion of an insole embodying features of the invention.

In the drawing the improved method is illustrated with reference to a laminated insole 10 (Fig. 6) comprising three layers or plies 12, 14 and 16, the middle layer 14 of which is composed of material which is more resistant to tearing than the material comprising the outer layers 12 and 16. As illustrated in Fig. 4, the marginal lip 18 and the marginal feather 20 are formed in the insole by the action of a channel or edge knife 22 constructed and arranged to make an oblique slit 24 in the sole margin, the slit 24 sloping downwardly from the upper corner of the edge face of the insole and extending through the material constituting the upper layer 12 and penetrating a substantial distance into the material constituting the middle layer 14, and thus, as clearly shown in Fig. 6, the lip 18 is reinforced near its root or base by means of a thin piece of material 26 cut from the middle layer 14.

To adapt the illustrated insole for use in the manufacture of cement lasted shoes, the slit 24 is made deep enough to form a feather of substantial width such as will be capable of affording a substantial area for attachment to the upper. In order, however, that the lip 18 formed by the slit 24 may be more readily raised or turned into position for lasting purposes, it is desirable that the lip shall be narrower than the feather. To this end a dividing knife 28 having a vertically disposed cutting edge is arranged to form a slit 30 in the insole intersecting the slit 24 and thus to cooperate with the edge knife 22 in forming a relatively narrow lip 18 and a chip or waste strip 32 outside of the lip. Thus an insole is provided having a relatively wide feather 20 and a relatively narrow lip 18 which may be readily raised and, if desired, turned backwardly into position to facilitate the lasting operation and which, on account of having been reinforced as above described at its base portion, is not liable to tear or give way under any stress to which the lip may be subjected either in the process of manufacturing the shoe or subsequently during the wearing of the shoe. Moreover, on account of the condensing or compressing of the feather, as will subsequently be described, the surface of the feather to which the upper margins are to be attached lies in a plane parallel to the faces of the insole and is thus best adapted to receive the upper margins.

The knife 22 operates to form a beveled surface at the upper side of the feather 20 and, in order to facilitate the cement lasting of an upper over the feather, provision is made for condensing or compressing the feather to make it of uniform thickness throughout its width so as to present an upper surface substantially parallel to the upper surface of the body portion of the insole. As shown in Fig. 5, the condensing of the feather 20 is effected by means of a presser foot 34 arranged to engage the beveled upper face of the feather and to cooperate with a work support, such as the rotary table 36, so as to modify the cross-sectional form of the feather from that shown in Fig. 4, to that shown in Fig. 5.

The machine illustrated in Figs. 1 and 2 for fitting insoles in the above-described manner comprises, in addition to the parts already referred to, a presser gage 38, an edge gage 40 and a work-retainer foot 42. Except as hereinafter described the machine herein illustrated operates to feed a sole and to slit the sole margin in substantially the same manner as the machine disclosed in United States Letters Patent No. 1,023,801, granted April 23, 1912, upon application of the present inventor, and reference may be had to said Letters Patent for details of construction and operation not herein fully described.

In the machine herein illustrated, as in the machine disclosed in the patent above referred to, the edge knife 22 and the presser gage 38 are each mounted upon a vertically yieldable slide 46 which is reciprocated in the line of work feed, the presser gage 38 being utilized to feed the sole during the forward movements of the slide and the retainer-foot 42 holding the work stationary during the return or backward movements of the slide 46. The edge knife 22 operates to cut the work on the backward movements of the slide 46 while the work is held stationary by the retainer-foot 42. The slide 46 is mounted for vertical yielding movement within an oscillatory head 48. As shown, the edge knife 22 is secured by means of screws 50 to a knife block 52 which, in turn, is secured by means of a screw 54 to the lower portion of the slide 46. The presser gage 38 is secured by means of a screw 56 to the slide 46 with provision for vertical adjustment relatively to the slide to vary the depth of the edge slit, i. e., the distance beneath the surface of the sole to which the edge knife is permitted to penetrate.

Laminated insoles being commonly manufactured of materials composed of wood fiber and rubber latex are often more difficult to cut than leather because of the presence of the latex which offers an excessive amount of resistance to the passage of a knife therethrough. To facilitate the passage of the edge knife 22 and the dividing knife 28 through the material of the insole, the dividing knife is set a substantial distance in advance of the edge knife, it having been found that such a relative arrangement of the knives insures cleaner cutting by both knives. Moreover, the chip formed by the cooperation of the edge knife 22 and the dividing knife 28 is liable to be more or less curled and crimped as a result of the presence of the latex in the insole stock and in order to provide ample clearance for the chip, and thus to insure against jamming of the stock in the machine to such an extent as to interfere with the feed, the dividing knife 28 is mounted on the presser gage 38 so that a substantial amount of open space is left in the immediate vicinity of the cutting edge of the edge knife.

As shown, the dividing knife 28 is mounted upon the presser gage 38 with provision for adjustment both vertically, to vary its depth of cut in the work, and horizontally in a direction transverse to the direction of work feed, to vary the width of the lip formed by the cooperative action of the two knives. As shown, the shank portion of the dividing knife 28 is received in a recess formed within a knife block 60 and is fixedly secured to the block by means of a screw 62, the latter extending through a vertically elongated slot 64 in the knife block and being threaded into the shank portion of the knife. The knife 28 is backed up by an adjusting screw 65 arranged to engage the upper end of the knife, the arrangement being such that when the screw 62 is loosened the adjusting screw 65 may be manipulated to vary the vertical adjustment of the knife. To provide for horizontal adjustment of the knife 28, the knife block 60 is dovetailed to slide within a horizontal groove 66 formed in one side of the presser gage 38. The knife block 60 is secured in adjusted position relatively to the presser gage by means of a screw 68 which extends through a slot 70 in the knife block and is threaded into the presser gage. Upon loosening the screw 68, a fine horizontal adjustment of the position of the knife block 60, and consequently of the dividing knife 28, may be effected by turning an adjusting screw 72, the inner end of which is arranged to bear against one end of the presser gage 38.

The presser foot 34, as best shown in Fig. 5, is shaped to enter the slit beneath the lip 18 and is provided with a flat bottom face 76 which is parallel to the face of the work table 36. The upwardly extending shank portion 78 of the presser foot 34 is received in a bore in the lower end of a slide rod 80 which in turn is mounted in a vertical bearing 82 formed in the oscillatory frame member 48. As shown, the shank portion 78 of the presser foot 34 is rigidly secured to the slide rod 80 by means of a binding screw 84 which is threaded through the enlarged lower extremity of the slide rod. The slide rod 80 extends upwardly above the bearing 82 and has a collar 86 rigidly secured thereon by means of a set screw 88. A spring 90 encircling the slide rod 80 above the collar 86 continuously forces the presser foot 34 downwardly with an amount of pressure sufficient to effect the desired condensation of the feather of the insole. Downward movement of the presser foot under the action of the spring 90 is limited by engagement of the collar 86 with the upper end of the bearing 82. As shown, two lugs 92 formed on the collar 86 are received in notches 94 in the upper end of the bearing 82 to prevent the slide rod 80 from turning therein and thus to maintain the presser foot in the proper position to operate upon the feather of the insole. By manually raising the slide rod 80 an amount sufficient to disengage the lugs 92 from the notches 94 and then turning the slide rod somewhat within the bearing 82, the presser foot may be removed from operative position and retained in inoperative position thereby adapting the machine to form a lip and a feather without, however, compressing the feather.

Having described my invention, what I claim as new and desire to secure by Letters Patent of the United States is:

1. That improvement in methods of operating on laminated soles having an inner layer which is more resistant to tearing than an outer layer of the sole, which consists in cutting inwardly from an outer, less resistant layer of a sole and terminating the cut within an inner, more resistant layer.

2. That step in the art of fitting laminated soles which consists in slitting inwardly from an exterior, less resistant lamination of a sole into an interior, more resistant lamination of the sole thereby forming a reinforced lip on the sole.

3. That improvement in methods of fitting soles which comprises slitting inwardly from the exterior of a sole to form a lasting lip and a feather, each of non-uniform thickness throughout its width, and compressing the feather into uniform thickness through its width.

4. That improvement in methods of channeling insoles having a wood fiber base and having in the interior of the sole a portion more resistant to tearing than both adjacent exterior portions of the sole, which consists in forming in a sole an edge slit extending inwardly from an exterior, less resistant portion and terminating in the interior, more resistant portion of the sole.

5. That method of fitting soles having interior portions more resistant to tearing than the exterior portions of the soles which consists in forming a slit extending obliquely inward from the exterior, less resistant portion of the sole and terminating within the interior, more resistant portion of the sole, thereby forming a channel flap and a feather which is thicker at the edge of the sole than at the root of the channel flap, and applying pressure to the feather to condense it to a uniform thickness throughout its width.

6. A step product consisting of a laminated sole having an inner layer more resistant to tearing than an outer layer of the sole, and having a cut extending inwardly through the outer, less resistant layer and terminating within the inner, more resistant layer of the sole.

7. A step product consisting of a sole of leather substitute material having in its interior portion a strengthening substance rendering that portion more resistant to tearing than the outer portions of the sole, and having a channel lip the root of which is located within the more resistant interior portion of the sole.

8. A step product consisting of a sole having a wood fiber base and having an interior portion more resistant to tearing than the exterior portions of the sole, and having a marginal slit extending through an exterior, less resistant portion and terminating within the interior, more resistant portion.

9. A step product consisting of a sole having an interior portion more resistant to tearing than the exterior portions of the sole, having a marginal slit extending through an exterior, less resistant portion and terminating within the interior, more resistant portion, and having a marginal feather of uniform thickness throughout its width.

10. A step product consisting of a laminated insole having a marginal lip of tapering cross-sectional form extending into an interior layer of the insole and a marginal feather of substantially uniform thickness throughout its width.

11. A step product consisting of an insole having in its interior portion a strengthening substance rendering that portion more resistant to tearing than the outer portion of the sole, and having a channel lip formed by a channel cut extending obliquely inwardly from the margin of the insole and terminating within the more resistant interior portion of the insole and having a feather condensed to the thickness of the portion of the insole at the root of the channel lip.

12. In a sole fitting machine, in combination, a support for a sole, a knife for forming an oblique slit in the sole edge and a beveled feather, a knife for slitting the face of the sole and co-operating with the edge knife in forming a lip narrower than the feather, and means for condensing the feather to uniform thickness.

13. In a sole fitting machine, in combination, a support for a sole, a knife for forming a slit in the sole edge, a presser gage for gaging the location of the slit relatively to the face of the sole, and a knife mounted on the presser gage and located in advance of the edge-slitting knife for slitting the sole face and cooperating with the edge-slitting knife in forming a lip which is narrower than the feather.

14. In a machine for operating upon soles, in combination, a support for a sole, a knife constructed and arranged to cut inwardly from the sole edge to form a marginal slit and a lasting lip, a presser gage fixed relatively to said knife for gaging the location of the slit in the sole edge, and a second knife mounted on said presser gage constructed and arranged to cut inwardly from the face of the sole in advance of the edge-slitting knife to form a slit adapted to be intersected by the edge slit.

15. In a channeling machine, in combination, a support for a sole, a channeling knife, a presser gage fixed relatively to the channeling knife for gaging the depth of the channel, and a knife mounted on said presser gage and constructed and arranged to cut inwardly from the face of the sole in advance of the channeling knife to form a slit adapted to be intersected by the channel cut.

16. In a machine for operating upon soles, in combination, a support for a sole, a knife constructed and arranged to cut inwardly from the sole edge to form a marginal slit and a lasting lip, a presser gage fixed relatively to said knife for gaging the location of the slit in the sole edge, and a second knife mounted on said presser gage constructed and arranged to cut inwardly from the face of the sole a substantial distance in advance of the edge-slitting knife to form a slit adapted to be intersected by the edge slit, said second knife being adjustable relatively to both the presser gage and the first knife to vary the depth of the slit made thereby.

17. In a machine for operating upon soles, in combination, a support for a sole, a knife constructed and arranged to cut inwardly from the sole edge to form a marginal slit and a lasting lip, a presser gage fixed relatively to said knife for gaging the location of the slit in the sole edge, and a second knife mounted on said presser gage constructed and arranged to cut inwardly from the face of the sole in advance of the edge-slitting knife to form a slit adapted to be intersected by the edge slit, said second knife being adjustable relatively to the presser gage to vary the location of the slit made thereby relatively to the edge of the sole.

18. In a machine for operating upon soles, in combination, a support for a sole, a knife constructed and arranged to cut inwardly from the sole edge to form a marginal slit and a lasting lip, a presser gage fixed relatively to said knife for gaging the location of the slit in the sole edge, a second knife mounted on said presser gage constructed and arranged to cut inwardly from the face of the sole in advance of the edge-slitting knife to form a slit adapted to be intersected by the edge slit, and means for adjusting said second knife relatively to the presser foot to vary the depth of the slit made thereby.

19. In a machine for operating upon soles, in combination, a support for a sole, a knife constructed and arranged to cut inwardly from the sole edge to form a marginal slit and a lasting lip, a presser gage fixed relatively to said knife for gaging the location of the slit in the sole edge, a second knife mounted on said presser gage constructed and arranged to cut inwardly from the face of the sole in advance of the edge-slitting knife to form a slit adapted to be intersected by the edge slit, and means for adjusting said second knife to vary the location of the slit made thereby relatively to the edge of the sole.

20. In a channeling machine, in combination, a support for a sole, a channeling knife constructed and arranged to form a transversely inclined channel in a sole on the support and thereby to form a channel lip and a feather having a beveled inner surface, a slitting knife constructed and arranged to cut inwardly from the face of the sole in a plane to intersect the cut made by the channeling knife, and means for compressing the feather to make it of uniform thickness throughout its width.

21. In a channeling machine, in combination, a support for a sole, a channeling knife constructed and arranged to form a transversely inclined channel in a sole on the support and thereby to form a channel lip and a feather having a beveled inner surface, a slitting knife constructed and arranged to cut inwardly from the face of the sole in a plane to intersect the cut made by the channeling knife, and a pressure-applying member constructed and arranged to compress the feather to uniform thickness, said member being adjustable into and out of operative position.

22. In a channeling machine, in combination, a support for a sole, a channeling knife constructed and arranged to form a transversely inclined channel in a sole on the support and thereby to form a channel lip and a feather having a beveled inner surface, a slitting knife constructed and arranged to cut inwardly from the face of the sole in a plane to intersect the cut made by the channeling knife, and a yielding presser foot constructed and arranged to ride along the beveled face of the feather for compressing the feather to uniform thickness throughout its width, said presser foot being retractable to an inoperative position, and means for holding the presser foot in retracted position.

FREDERIC E. BERTRAND.